(12) United States Patent
Gesto

(10) Patent No.: US 10,807,425 B1
(45) Date of Patent: Oct. 20, 2020

(54) TOWING DEVICE

(71) Applicant: Pro-Tote Systems, Inc., South Bend, IN (US)

(72) Inventor: James Gesto, South Bend, IN (US)

(73) Assignee: Pro-Tote Systems, Inc., South Bend, IN (US)

( * ) Notice: Subject to any disclaimer, the term of this patent is extended or adjusted under 35 U.S.C. 154(b) by 0 days.

(21) Appl. No.: 16/831,120

(22) Filed: Mar. 26, 2020

(51) Int. Cl.
| | | |
|---|---|---|
| *B60D 1/28* | (2006.01) | |
| *B60D 1/48* | (2006.01) | |
| *B60D 1/167* | (2006.01) | |
| *B60D 1/52* | (2006.01) | |
| *B62D 53/08* | (2006.01) | |
| *B60D 1/06* | (2006.01) | |
| *B60D 1/04* | (2006.01) | |

(52) U.S. Cl.
CPC ............ *B60D 1/488* (2013.01); *B60D 1/167* (2013.01); *B60D 1/28* (2013.01); *B60D 1/52* (2013.01); *B60D 1/04* (2013.01); *B60D 1/065* (2013.01); *B62D 53/08* (2013.01)

(58) Field of Classification Search
CPC .......... B60D 1/488; B60D 1/52; B60D 1/167; B60D 1/28; B60D 1/065; B60D 1/04; B62D 53/08
See application file for complete search history.

(56) References Cited

U.S. PATENT DOCUMENTS

| | | | | |
|---|---|---|---|---|
| 4,842,472 A | * | 6/1989 | Plant | ....................... B60P 3/125 280/402 |
| 6,036,428 A | | 3/2000 | Kooima | |
| 8,992,155 B2 | * | 3/2015 | Meenen | ............. B62D 53/0842 414/540 |
| 10,308,087 B1 | | 6/2019 | Frosch et al. | |
| 2003/0184046 A1 | | 10/2003 | Bourgault et al. | |
| 2005/0023797 A1 | * | 2/2005 | Zackovich | ......... B62D 53/0828 280/415.1 |
| 2006/0255559 A1 | | 11/2006 | Abate et al. | |
| 2010/0038881 A1 | | 2/2010 | Ford et al. | |
| 2011/0181016 A1 | * | 7/2011 | Schuettenberg | ....... B60D 1/488 280/402 |
| 2014/0339792 A1 | * | 11/2014 | Schuettenberg | ....... B60D 1/145 280/504 |
| 2015/0202934 A1 | | 7/2015 | Meenen et al. | |

FOREIGN PATENT DOCUMENTS

| | | |
|---|---|---|
| EP | 0922380 A2 | 6/1999 |
| EP | 1439113 A1 | 7/2004 |
| EP | 1810878 A2 | 7/2007 |

OTHER PUBLICATIONS

Retriever. Farm Tractor Hitch. First Accessed Feb. 6, 2020.

* cited by examiner

*Primary Examiner* — Kevin Hurley
*Assistant Examiner* — Marlon A Arce
(74) *Attorney, Agent, or Firm* — Beem Patent Law Firm

(57) ABSTRACT

The present invention relates generally to towing devices. More specifically, the invention relates to a towing device configured to be mounted on a towing vehicle having a fifth wheel. The towing device may include a horizontal member and a vertical member. A frame pan extends below the horizontal member and includes connection members which are movable through slits and configured to engage and secure to the frame of the towing vehicle. The vertical member of the towing device includes a hitch assembly to facilitate the connection of a hitch, such as a pintle or ball hitch, to a coupler of a trailer.

20 Claims, 6 Drawing Sheets

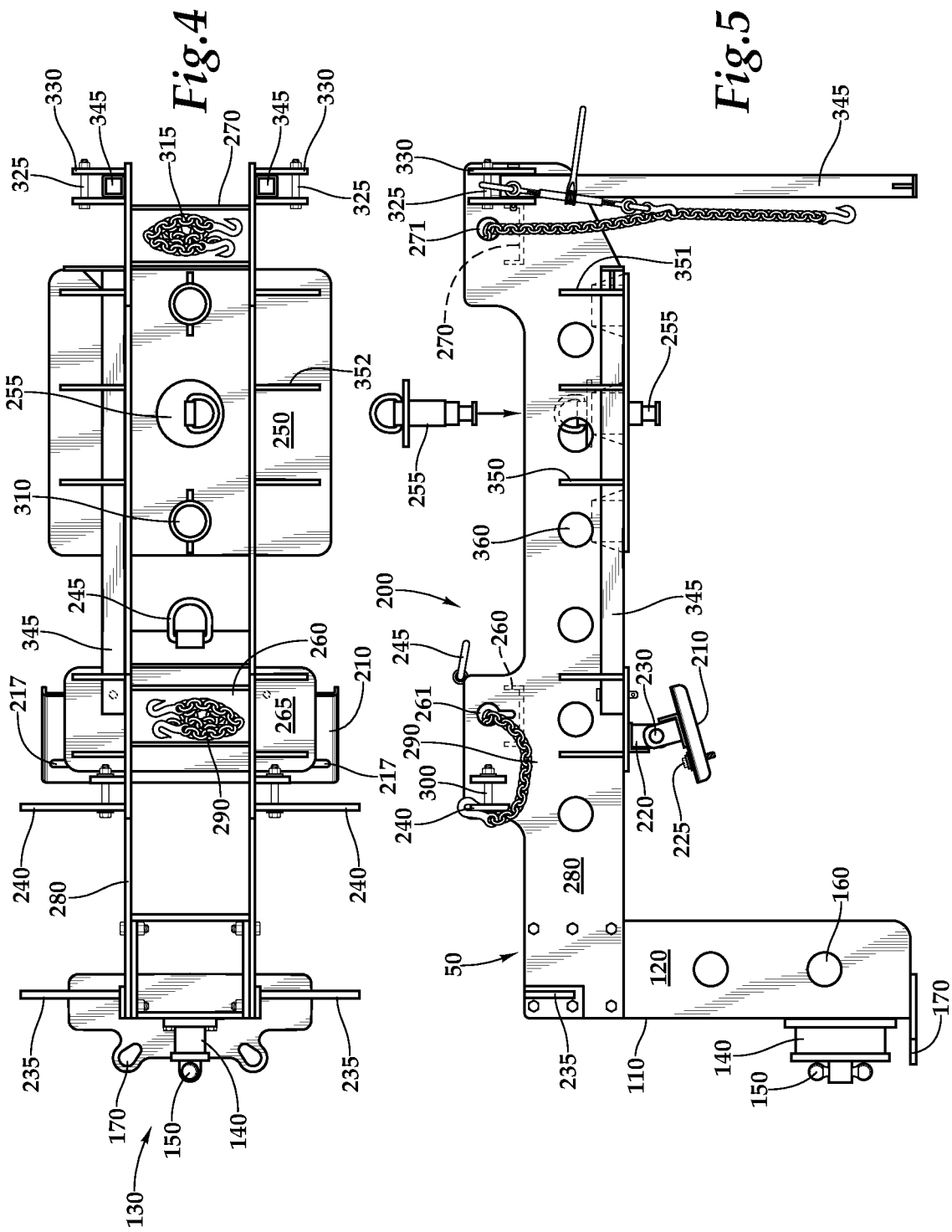

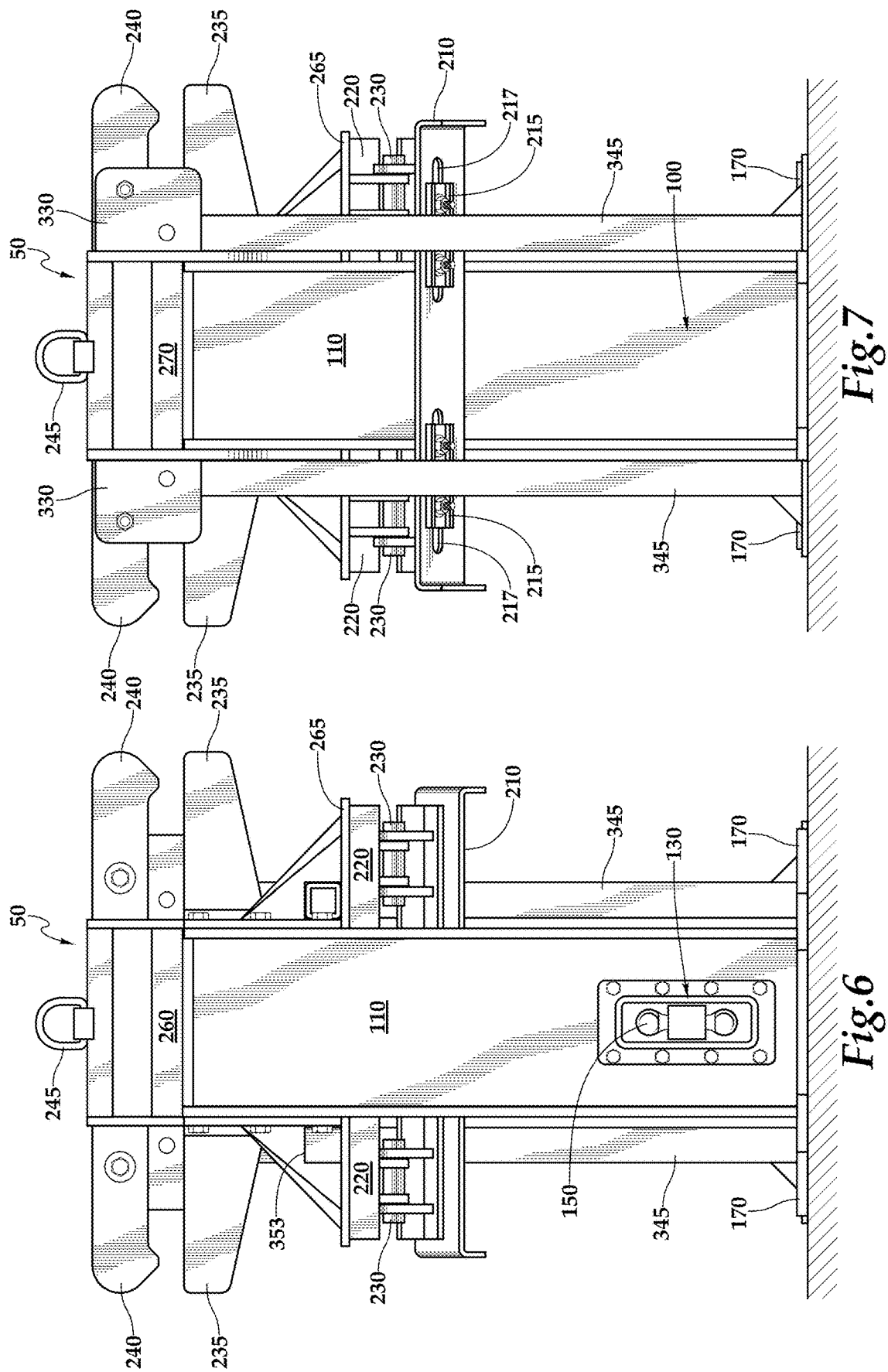

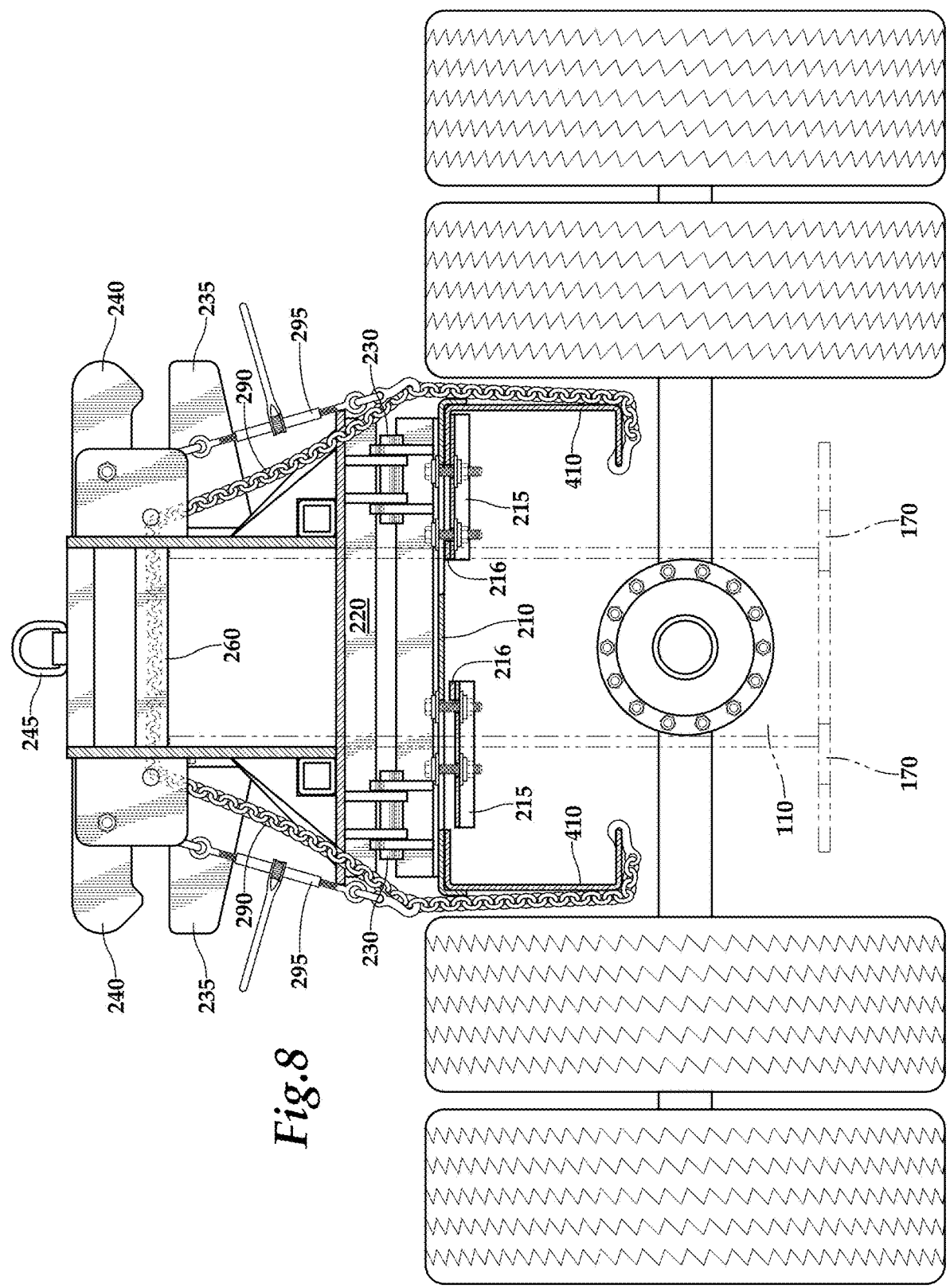

TOWING DEVICE

FIELD OF INVENTION

The present invention relates generally to towing devices. More specifically, the invention relates to a towing device for attaching to a fifth wheel of a vehicle, such as a semi-truck tractor, to facilitate the connection of a hitch, such as a pintle or ball hitch, to a trailer.

BACKGROUND OF THE INVENTION

A trailer refers to an unpowered vehicle towed by a powered vehicle. Trailers are commonly used for transporting goods and/or materials. Traditionally, a trailer hitch, fifth-wheel coupling or other type of tow hitch is used to draw a trailer with a car, truck or other traction engine.

Many tow hitches include a ball and socket connection. For a ball and socket connection, a trailer coupler attaches to a trailer ball, securing the trailer to the towing vehicle. This connection provides for relative movement between the towing vehicle and trailer while towing over uneven road surfaces.

The trailer ball may be mounted to the rear bumper or to a draw bar, which may be removable. The draw bar may be secured to the trailer hitch by inserting it into the hitch receiver and pinning it. Examples of couplers may include straight couplers, A-frame couplers, and adjustable couplers. Bumper-pull hitches and draw bars can exert leverage on the tow vehicle making it harder to recover from a swerving situation.

While traditional hitches are connected to the bumper, other hitches are attached to the bed of the towing vehicle. Hitches that attach to the bed of the vehicle facilitate towing larger loads, such as those between 10,000 and 30,000 pounds. One example of a hitch that attaches to the bed of a vehicle is a fifth wheel, which provide for a more efficient and central attachment of a large trailer to the tow vehicle.

A fifth wheel uses a large horseshoe-shaped coupling device mounted a foot or more above the bed of the tow vehicle. The fifth-wheel coupling may provide the link between a semi-trailer and the towing vehicle, tractor unit, leading trailer or dolly. The coupling may consists of a kingpin, often a vertical steel pin protruding from the bottom of the front of the semi-trailer, and a horseshoe-shaped coupling device called a fifth wheel on the rear of the towing vehicle. In operation, as the towing vehicle turns, the downward-facing surface of the semi-trailer (with the kingpin at the center) rotates against the upward-facing surface of the fixed fifth wheel, which does not rotate.

The disadvantage of tow hitches and receivers is that they are often not compatible with one another. For example, a ball hitch is typically not compatible with a fifth wheel coupling. As such, a user operating a tractor that can engage a fifth wheel of a trailer will often need to use a different towing vehicle to tow a trailer having a coupler for receiving a ball hitch.

Accordingly, there is a need for a towing device which can attach to a fifth wheel of a tow vehicle to facilitate conventional towing and for towing via the fifth wheel. The present invention satisfies this need.

SUMMARY OF THE INVENTION

The present invention relates generally to towing devices. More specifically, the invention relates to a towing device that is configured to be mounted on a towing vehicle having a fifth wheel. Advantageously, the towing device facilitate the connection of a hitch, such as a pintle or ball hitch, to a coupler of a trailer.

The towing device is configured to be removably attached to a frame of the towing vehicle. The towing device may be substantially "L" shaped and comprise a vertical member and a horizontal member.

Embodiments of the vertical member may include a tow hitch assembly for connecting to a corresponding coupler. Vertical member may further include a step panel, openings, and one or more tabs for receiving a securing component.

The vertical member may be bolted to the horizontal member. One or more lift arms may extend from the horizontal member for use with a fork lift to position the towing device onto a towing vehicle.

A frame pan may extend below the horizontal member at one end. The frame pan includes connection members, which are movable and configured to engage and secure to the frame of the towing vehicle.

The other end of the horizontal member may include one or more retainers adapted to receive a kingpin. Once positioned within one of the retainers, the kingpin can couple a fifth wheel of the towing vehicle. The fifth wheel may be of any known design, and typically includes receiving jaws to secure the kingpin.

Chain openings of the towing device may also be used for receiving safety chains that further secure the towing device to the vehicle. In addition, hoses and cables can be attached to accessory openings of the towing device.

The present invention and its attributes and advantages will be further understood and appreciated with reference to the detailed description below of presently contemplated embodiments, taken in conjunction with the accompanying drawings.

BRIEF DESCRIPTION OF THE DRAWINGS

FIG. 4 shows a top view of the towing device;

FIG. 5 shows a side view of the towing device supported by legs;

FIG. 6 shows a front view of the towing device;

FIG. 7 shows a rear view of the towing device;

FIG. 8 illustrates the towing device coupled to the towing device via the frame pan and safety chains.

DETAILED DESCRIPTION OF THE INVENTION

Figure 1:
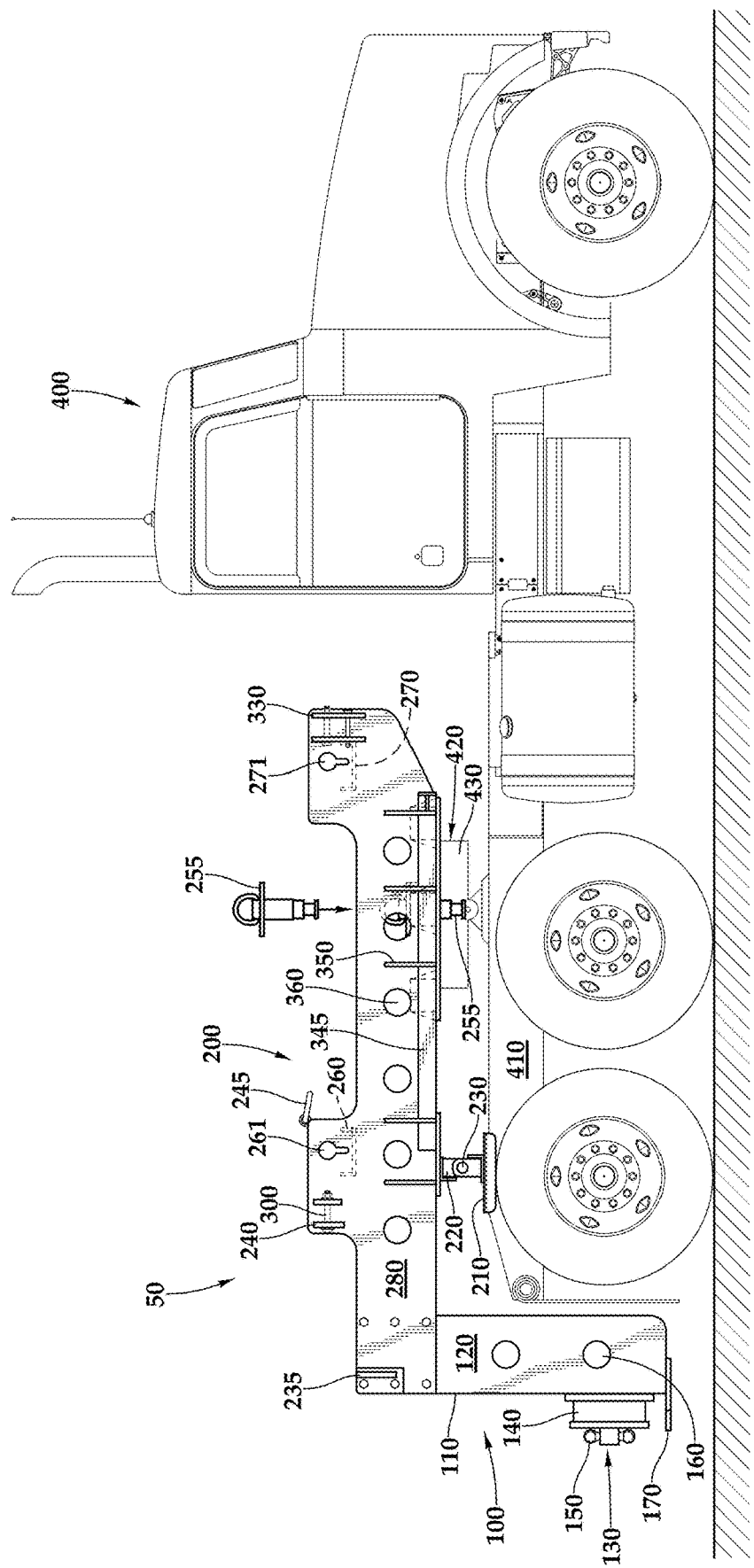
FIG. 1 shows a side view of a towing device on a towing vehicle.

The present invention is generally directed to towing devices and, more specifically, to a detachable towing device for attaching to a fifth wheel of a vehicle, such as a semi-truck tractor, to facilitate the connection of a hitch, such as a pintle or ball hitch, to a coupler of a trailer. The figures illustrate different views of the device. As can be seen in FIG. 1 through FIG. 7, the towing device 50 includes a vertical member 100 and a horizontal member 200. The towing device may range from about seventy-five (75) inches to about one hundred and fifty (150) inches from front to back, and preferably be approximately one hundred (100)

inches from front to back. As shown, the towing device is configured as substantially "L" shaped, however, other shapes are contemplated.

The vertical member 100 includes a front wall 110. The front wall includes a hitch assembly 130, which may be bolted on using, for example, ½ inch bolts. In one instance, hitch assembly 130 includes bracket 140 and a hitch 150, such as a pintle or ball hitch. Other hitches are also contemplated and easily interchangeably with hitch 130. In addition, one or more tabs 170 may extend from the front wall 110 to, for example, secure to a chain or other securing device.

The vertical member 100 also includes two side walls 120. The side walls 120 may include openings 160. Openings 160 may be used for securing cables or other accessories to the towing device 50. A step panel 180 may extend from the bottom of each side wall 120 such that a user may easily access other components of towing device 50. The step panel 180 may be approximately six (6) inches wide and extend eight (8) inches past each side wall 120. At the top end of side walls 120, the vertical member 100 connects to horizontal member 200 via one or more bolts.

Figure 2:
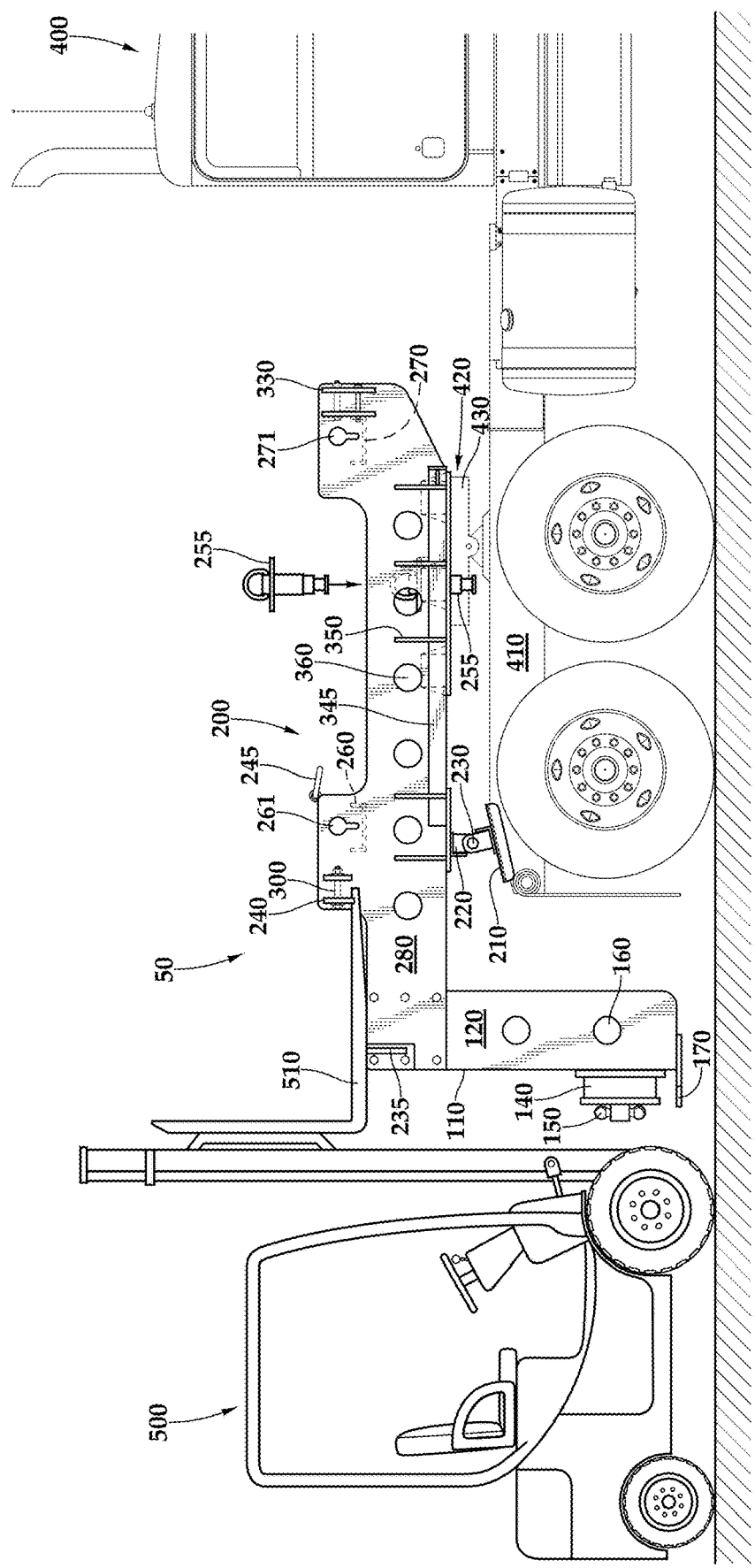
FIG. 2 shows a side view of the towing device positioned on a towing vehicle via a forklift.
Figure 3:
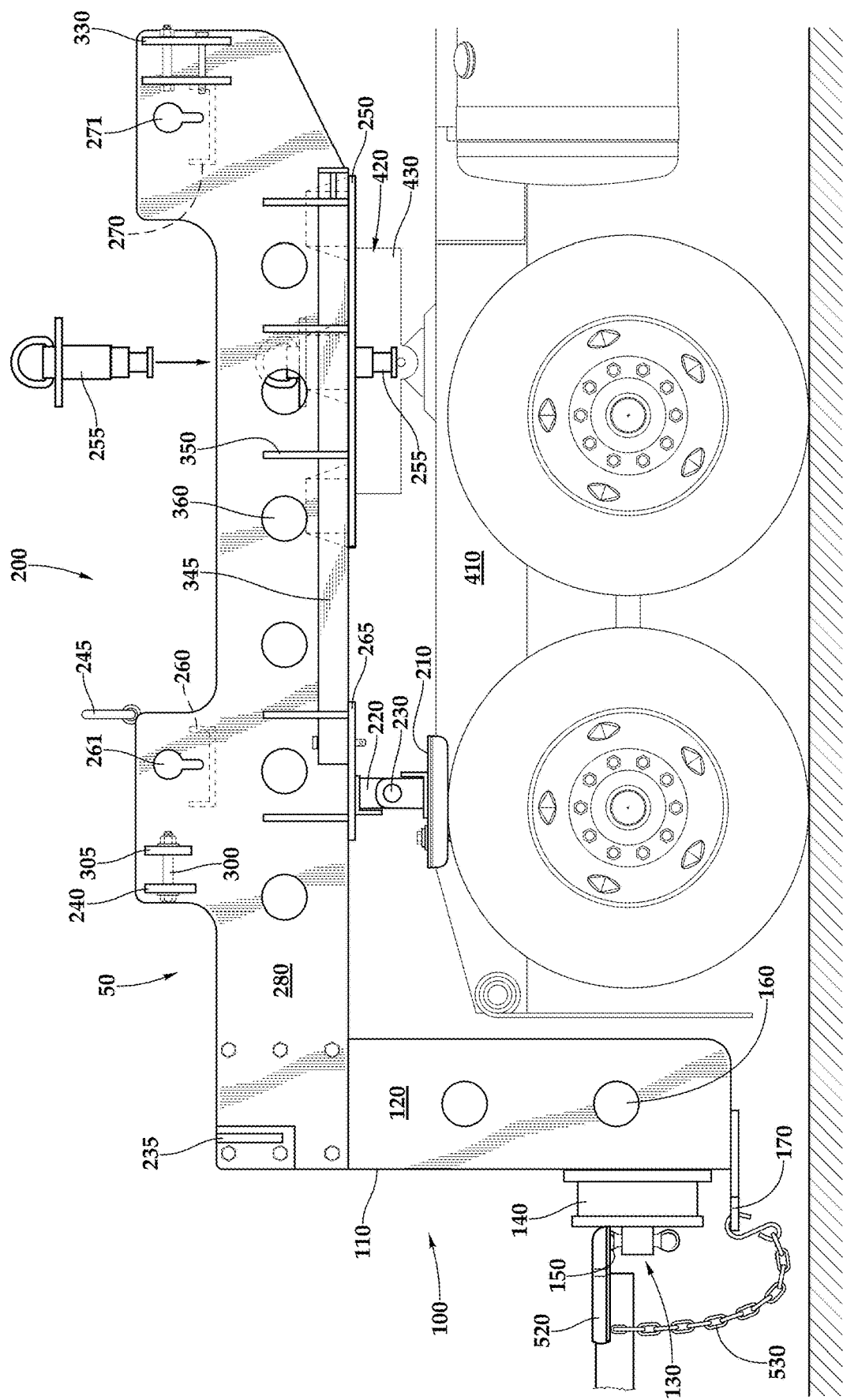
FIG. 3 shows a side view of the towing device coupled to a coupler.

FIG. 1, FIG. 2, and FIG. 3 illustrate the towing device 50 positioned on a towing vehicle 400, such as a tractor-trailer. More specifically, the horizontal member 200 of the towing device 50 includes a frame pan 210 that is configured to secure to a frame 410 of the vehicle 400, as detailed below. The frame pan may range from about thirty (30) to about forty (40) inches in length, and preferably be about thirty-five (35) to about thirty-eight (38) inches in length. In one embodiment, the frame pan is approximately thirty-six (36) inches long and include curved ends to wrap around a frame.

Frame pan 210 is attached to a cross bar 220 via a mounting pin 230. As shown, frame pan 210 may rotate about the mounting pin 230 and connect to the vehicle frame 410 in a level position (FIG. 1) or an angled position (FIG. 2).

Towing device 50 is further secured to a fifth wheel 420 of vehicle 400. The fifth wheel 420 may include a head pan 430 that is configured to receive a portion of the horizontal member 200. More specifically, support panel 250 (FIG. 5) extends from each side of the horizontal member 200 for positioning on head pan 430 of the fifth wheel 420. Support panel may be approximately twenty-nine (29) inches in length.

Once positioned on the head pan 430, a kingpin 255 may couple the fifth wheel 420 of the vehicle 400. The fifth wheel 420 may be of any known design, and typically includes receiving jaws to secure the kingpin 255.

As shown in FIG. 2, a fork lift 500 may position the towing device 50 on vehicle 400 for securing a kingpin within the fifth wheel 420. More specifically, the towing device 50 may include front lift arms 235 and rear lift arms 240 projecting from each side of the horizontal member 200. Each fork arm 235, 240 is configured to engage at either a top surface or a bottom surface a lift member 510 of the fork lift 500. Certain embodiments of the horizontal member 200 may further include a latch 245. In one instance, a crane may be used to hook the latch 245 in order to lift and position the towing device 50 on vehicle 400 or remove towing device 50 from vehicle 400.

Once positioned on vehicle 400, towing device 50 may be used to tow a mobile unit, such as a trailer. As shown in FIG. 3, the hitch 150 of hitch assembly 130 may connect with a coupler 520. In one example, the hitch 150 may be a ball hitch having a diameter of 1⅞ inches, 2 inches, 2 5/16 inches or 2½ inches. In another example, the hitch 150 may be a pintle hitch or a 4-point hitch.

Additionally, coupler chains 530 may attach to tabs 170 of the towing device 50. Other securing devices, such as cables or rope, may be positioned through openings 160 of the vertical member 100 to further secure towing device 50 to the trailer.

FIG. 4 illustrates a top view of the towing device 50. As shown, the horizontal member 200 includes a front chain channel 260 and a back chain channel 270, both channels 260, 270 positioned between side walls 280. Side walls 280 may range from about ten (10) to about fifteen (15) inches from one another, and preferably be about twelve (12) to about thirteen (13) inches apart. In one embodiment, the side walls 280 are approximately twelve and a half (12.5) inches from one another.

Front chain channel 260 is positioned above a frame support panel 265. Frame support panel may range from about twenty-five (25) to about thirty-five (35) inches, and preferably be about twenty-eight (28) to about thirty (3) inches. In one embodiment, frame support panel 265 is approximately twenty-nine and a half (29.5) inches and extends from sides walls 280 of the horizontal member 200.

The front chain channel 260 is configured to retain all or a portion of a front safety chain 290. The safety chain 290 may include hooks at either end to, for example, secure to the frame 410 of towing vehicle 400 (FIG. 8). One or more ratchet binders 295 (FIG. 8) may facilitate tightening the safety chain 290 to the vehicle 400, thereby further securing said towing device 50. As shown in FIG. 5, front safety chain 290 may hook on to lift arm 235, such as when the towing device 50 is not mounted on said towing vehicle 400.

The one or more ratchet binders 295 may be attached to horizontal member 200. More specifically, ratchet binders 295 may include an opening for linking to a ratchet bolt 300, such as a ⅝ inch bolt. The bolt 300 may connect the rear lift arms 240 and mounting ears 305 such that the ratchet binders 295 are positioned between those two components on either side of the horizontal member 200.

As shown in FIG. 4, support panel 250 extends from both side walls 280 of the horizontal member 200. Between the side walls 280, the support panel 250 may include one or more kingpin retainers 310. While the towing device 50 includes three kingpin retainers 310, a different number of retainers is contemplated.

The distance between kingpin retainers 310 may range from about ten (10) to about forty (15) inches, and preferably be about twelve (12) inches from one another. The diameter of each kingpin retainers 310 may range from about three (3) to about six (6) inches, and preferably be about four (4) inches.

As shown, the kingpin retainers 310 are configured to receive kingpin 255, which can engage with the fifth wheel 420 of vehicle 400.

In other examples, the positioning of a kingpin within kingpin retainers 310 may be based on the type of towing vehicle and the positioning of the fifth wheel on that towing vehicle. More specifically, in order for the vertical member 100 of the towing device 50 to be positioned at a specific distance from the towing vehicle, an operator may need to contemplate positioning a kingpin within a front, middle, or back kingpin retainer. In addition, other factors, such as the positioning of the frame pan 210 may determine the placement of a kingpin within a kingpin retainer of the support panel 250.

Above the support panel 250, toward the rear end of the horizontal member 200, the rear chain channel 270 is configured to retain all or a portion of a rear safety chain 315. The rear safety chain 315 may include hooks at either end to, for example, secure to the frame 410 of towing vehicle 400. One or more rear ratchet binders 320 may facilitate tightening the rear safety chain 315 to the vehicle 400, thereby further securing said towing device 50.

The one or more rear ratchet binders 320 may be attached to horizontal member 200. More specifically, rear ratchet binders 320 may include an opening for linking to a ratchet bolt 325, such as a ⅝ inch bolt. The bolt 325 may couple a set of rear mounting ears 330 such that the ratchet binders 320 are positioned between the rear mounting ears 330 on either side of the horizontal member 200.

Rear mounting ears 330 may further include openings for receiving a locking pin 340. The locking pin 340 may secure legs 345 to the mounting ears 330 on either side of the horizontal member 200. More specifically, legs 345 are removable and may be configured to hold up the rear end of the horizontal member 200, such as when the towing device 50 is not positioned on a towing vehicle.

As shown in FIG. 4 and FIG. 5, legs 345 may also be stored on towing device 50 when not in use. More specifically, the horizontal member 200 includes a plurality of storage elements 350 connected to both the horizontal member 200, support panel 250, and frame support panel 265. Storage elements 350 may strengthen the overall towing device 50 and each include a gap 353 for receiving said removable legs 345. The towing device may have ten (10) storage elements 350, each having a height in a range between about five (5) and about ten (10) inches and preferably between about seven (7) and about eight (8) inches. In one embodiment, the storage elements have an approximate height of seven and a half (7.5) inches.

Storage elements 350 includes a first edge 351 and a second edge 352. The first edge 351 is connected to the side walls 280 of the horizontal member 200 and the second edge 532 is connected to the top surface of the support panels 250, 265. As shown in FIG. 6, and FIG. 7, each storage element 350 includes a gap 353 sized such that legs 345 may be positioned against side walls 280 and support panels 250, 265. The legs 345 may then be secured to one or both support panels 250, 265 by one or more leg locking pins.

FIG. 5 illustrates a side view of the towing device 50. As shown, the side walls 280 of horizontal member 200 include a front chain opening 261 corresponding to front chain channel 260 and a rear chain opening 271 corresponding to rear chain channel 270. Chain openings 261, 271 include an indent for receiving safety chains 290, 315.

In addition, horizontal member 200 includes a plurality of accessory openings 360. Accessory openings may be spaced approximately twelve (12) inches apart and configured to retain cables and other accessories. For example, an operator may attach additional safety cables, wiring, and roping to accessory openings 360. In addition, openings 360 reduce the overall weight of the towing device to, for example, reduce the amount of force on a towing vehicle.

FIG. 8 illustrates exemplary connections of the towing device 50 to the towing vehicle 400. As shown, the frame pan 210 of towing device 50 is positioned flush against a top surface and wraps around a side surface of frame 410. Frame 410 may be substantially "C" shaped such that the frame pan 210 may be mounted on a top surface of an upper part of the frame 410. Frame pan 210 includes connection members 215 that are movable through slits 217 and configured to engage and secure to a bottom surface of the upper part of the frame 410. Connection members 215 further may include a spacer 216 such that, when secured to the bottom surface of the upper part of frame 410, the connection members 215 remain level.

Frame pan 210 further includes one or more connection bolts 225 which an operator can tighten or release for engaging the connection members. As shown in exemplary FIG. 8, a first connection member has been slid over and tightened to frame 210 while a second connection member is in a released position. While each connection member 215 is shown to have two connection bolts 225, other connections are contemplated.

The towing device 50 is further secured to towing vehicle 400 via the front safety chain 290. As shown, safety chain 290 is a continuous single chain that runs through chain channel 260. Hooks at each end of the safety chain 290 are adapted to couple with a bottom end of frame 210. Once attached, an operator may tighten ratchet binders 295 to further secure said towing device 50 to the towing vehicle 400. More specifically, ratchet binders 295 may catch a portion of safety chain 290 and remove any slack. Other positions of the safety chain are also contemplated, such as through accessory openings of the horizontal member 200.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described in the Application are to be taken as examples of embodiments. Elements and materials may be substituted for those illustrated and described in the Application, parts and processes may be reversed, and certain features of the invention may be utilized independently, all as would be apparent to one skilled in the art after having the benefit of this description of the invention. Changes may be made in the elements described in the Application without departing from the spirit and scope of the invention as described in the following claims.

What is claimed is:

1. A towing device for attaching to a fifth wheel, the towing device comprising:
    a horizontal member and a vertical member;
    a hitch assembly attached to said vertical member for coupling a coupler;
    a pan extending from said horizontal member for mounting on a top surface of an upper part of a vehicle frame;
    a member configured to movably engage a bottom surface of said upper part of said vehicle frame and releasably secure said pan to said upper part; and
    one or more retainers of said horizontal member for receiving a kingpin.

2. The towing device of claim 1, wherein the pan is connected to a cross bar of the horizontal member via a mounting pin.

3. The towing device of claim 1, wherein the pan includes slits at each end for receiving said connection members, each connection member including one or more bolts for tightening said connection member to said vehicle frame.

4. The towing device of claim 1, further comprising one or more chain channels, each chain channel configured to receive a safety chain, each safety chain positioned through chain openings of said horizontal member and configured to hook to said vehicle frame.

5. The towing device of claim 4, wherein said chain openings further include an indent for receiving said safety chains.

6. The towing device of claim 4, further comprising ratchet binders on each side of the horizontal member, the ratchet binders configured to tighten the safety chains for securing the horizontal member to the vehicle frame.

7. The towing device of claim 1, wherein said hitch assembly comprises at least one of a ball hitch and a pintle hitch.

8. A towing device for attaching to a fifth wheel, comprising:
- a horizontal member and a vertical member;
- a support panel extending from side walls of said horizontal member for positioning on a head pan of a fifth wheel;
- a hitch assembly attached to said vertical member for coupling a coupler;
- a frame pan extending from said horizontal member, said frame pan including receiving connection members configured to movably engage and secure to a vehicle frame; and
- one or more retainers of said horizontal member for receiving a kingpin.

9. The towing device of claim 1, further comprising lift arms extending from said horizontal member, the lift arms adapted for use with a fork lift.

10. A towing device for mounting to a tractor, said towing device comprising:
- a hitch assembly attached to a vertical member, said hitch assembly including a bracket and hitch;
- a horizontal member extending from said vertical member, said horizontal member comprising:
  - side walls including one or more chain openings and one or more accessory openings;
  - a frame support panel attached to a frame pan, said frame pan including connection members configured to movably engage and secure to a frame of said tractor; and
  - a support panel including two or more retainers, said retainers configured to receive a kingpin for attaching to a fifth wheel of the tractor.

11. The towing device of claim 10, wherein said frame pan is connected, via a mounting pin, to said frame support panel.

12. The towing device of claim 10, wherein said frame pan includes slits at each end for receiving said connection members, each connection member including one or more bolts for tightening said connection member to the tractor.

13. The towing device of claim 10, wherein said support panel extends from said side walls for positioning flush with a head pan of the fifth wheel.

14. The towing device of claim 10, wherein said chain openings include an indent for receiving a safety chain.

15. The towing device of claim 14, wherein said safety chain includes one or more hooks configured to secure to the frame.

16. The towing device of claim 14, further comprising ratchet binders attached to said side walls of the horizontal member, said ratchet binders configured to tighten the safety chain.

17. The towing device of claim 10, further comprising one or more removably attached legs configured to couple mounting ears extending from said side walls of said horizontal member.

18. The towing device of claim 17, further comprising a plurality of storage elements, each storage element including a gap for receiving the one or more legs.

19. The towing device of claim 10, wherein said hitch comprises at least one of a ball hitch and a pintle hitch.

20. The towing device of claim 10, further comprising one or more tabs projecting from said vertical member for receiving one or more chains.

* * * * *